3,701,810
PROCESS FOR THE PRODUCTION OF METHYL
ETHYL KETONE FROM n-BUTENE
Hiroshi Hasegawa, 500 Shimotsu, Shimotsu-cho, Kaiso-gun, and Makoto Iriuchijima, 448 Kata, Shimotsu-cho, Kaiso-gun, both of Wakayama, Japan
Filed Dec. 4, 1968, Ser. No. 780,958
Int. Cl. C07c 45/02; B01j 11/78, 11/82
U.S. Cl. 260—597 B          12 Claims

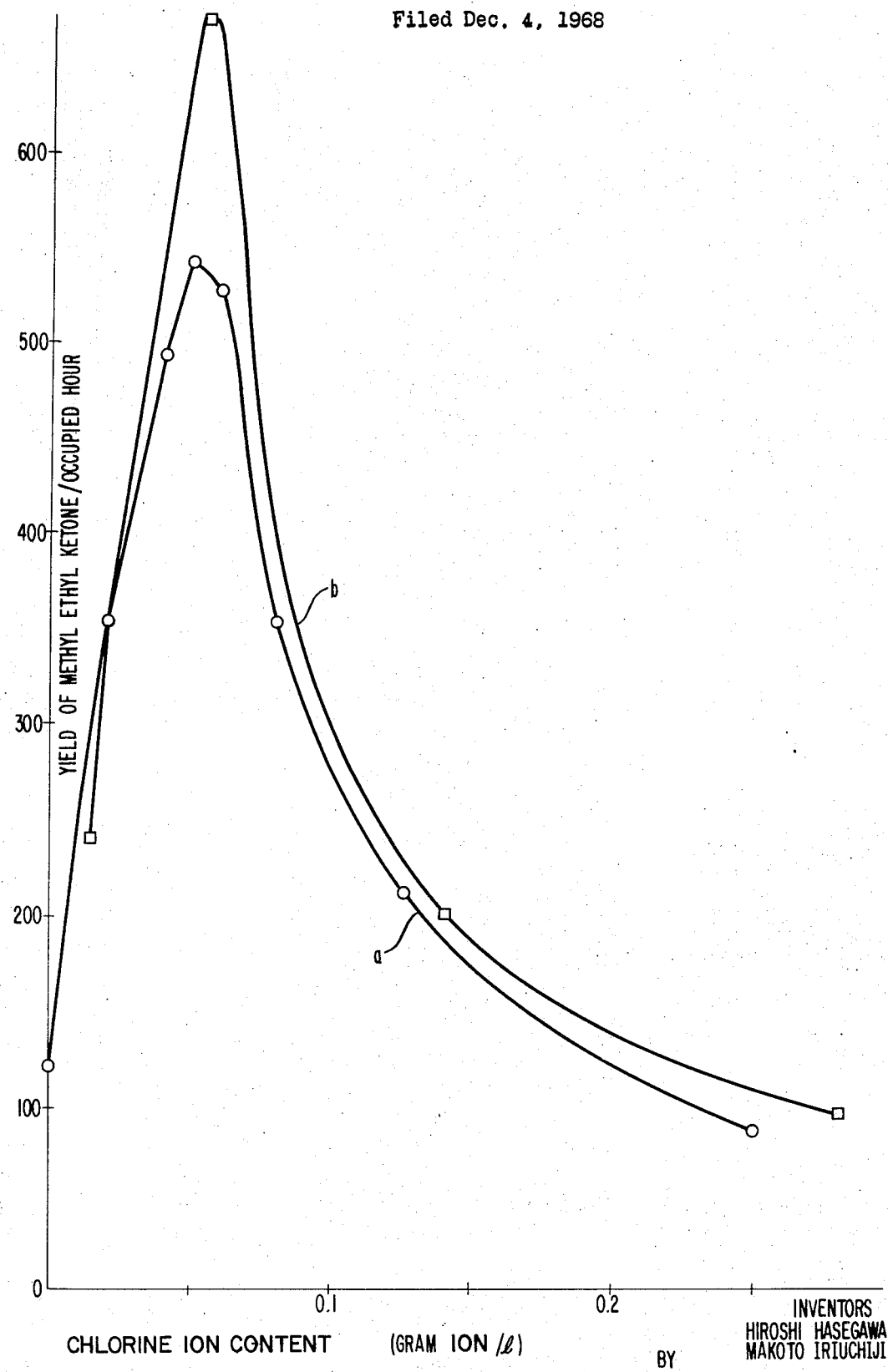

ABSTRACT OF THE DISCLOSURE

Producing methyl ethyl ketone at a high space-time yield with reduced formation of by-products comprising contacting n-butene with an aqueous catalyst solution containing a water-soluble chloride compound, water-soluble palladium compound and ferric sulfate, the chlorine ion content (per liter) of said aqueous solution being 0.005–0.15 gram-ion and the chemical equivalent ratio of chlorine to palladium in the solution being within the range 1.5/1–20/1. The novel catalyst solution described also forms part of the present invention.

BACKGROUND OF THE INVENTION

Field of the invention

The present invention relates to a process for the production of methyl ethyl ketone from n-butene at a high space time yield (by the term "space time yield" is meant the yield per unit hour per unit reactor volume). More particularly, it relates to a process for the production of methyl ethyl ketone by the reaction of n-butene with an aqueous catalyst solution containing a water-soluble chloride compound, a water-soluble palladium compound and ferric sulfate in a specific composition, which enables the large scale production of methyl ethyl ketone with a reduced by-products formation.

Description of the prior art

It is known that a monoolefin can be converted into a carbonyl compound by reaction in the presence of palladium chloride, cupric chloride and water, according to the following reaction scheme:

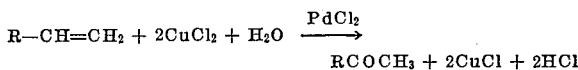

$$R-CH=CH_2 + 2CuCl_2 + H_2O \xrightarrow{PdCl_2} RCOCH_3 + 2CuCl + 2HCl$$

(wherein R represents hydrogen or alkyl group).

Processes using the above-mentioned reaction are referred to as "Hoechst-Wacker Processes," and were first reported in "Angewandte Chemie," 71, pp. 176–182 (1959). Following this first report, a number of patents and literature articles have analyzed this process. The process has also been applied on a large scale to the production of acetaldehyde from ethylene, or to the production of acetone from propylene.

However, the application of this process to higher olefins having four or more carbon atoms, for example, n-butene to produce methyl ethyl ketone, has not yet been satisfactorily accomplished on a large scale, due to the following problems:

In the Hoechst-Wacker Process using a palladium chloride-cupric chloride type catalyst, the space time yield of the product carbonyl compounds abruptly decreases as the carbon number of the olefin increases. It is reported in "Proceedings of the Sixth Petroleum Congress, Section IV," Paper 40, page 4, in great detail that the space-time yield of acetone is 130 (g./lit./hr.) when it is produced by the reaction of propylene with an aqueous solution of palladium chloride-cupric chloride at a temperature of 90–100° C. under a pressure of 9–12 atm. However, the space-time yield of methyl ethyl ketone is reported as only 30 (g./lit./hr.) when it is obtained by the reaction of n-butene with the same catalyst solution under the same reaction conditions. The space-time yield (30 g./lit./hr.) of methyl ethyl ketone is about one tenth that of acetaldehyde and about ¼ that of acetone, means that only a very minor amount of methyl ethyl ketone is obtainable for n-butene using ordinary reactors and ordinary reaction periods. Thus, the process is essentially unacceptable for industrial and economical operation.

These disadvantages have been serious problems in carrying out the large scale production of methyl ethyl ketone from n-butene.

It is desirable in this art to produce methyl ethyl ketone from n-butene at increased space-time yields which are at least equal to, or greater than, the yields of acetaldehyde or acetone. The solution of the heretofore described problems has been considered as essential before the large scale production of methyl ethyl ketone at low cost could be realized. However, no effective process has yet been proposed despite extensive and elaborate studies which have been performed up to now.

SUMMARY OF THE INVENTION

In order to overcome the above problems, the inventors have discovered that methyl ethyl ketone can be obtained at high space time yields with reduced formation of by-products, such as 3-chloro-butanone-2, by bringing n-butene in contact with an aqueous catalyst solution containing a water-soluble chloride compound, a water-soluble palladium compound and ferric sulfate, in which the content of chlorine ion per liter of the aqueous solution is 0.005–0.15 gram-ion, preferably 0.01–0.1 gram-ion, and the chemical equivalent ratio of chlorine to palladium in said solution is within the range of 1.5/1–20/1.

A second aspect of the present invention involves the novel catalyst solution described.

Accordingly, a basic object of the present invention is to provide a process for the production of methyl ethyl ketone from n-butene at a high space time yield.

Another object of the present invention is to provide a process whereby methyl ethyl ketone can be produced from n-butene at low cost and at a large scale.

Another object of the present invention is to provide a process for the production of pure methyl ethyl ketone with a minimum by-product content from n-butene.

A still further object of the present invention is to provide a process for the conversion of n-butene into methyl ethyl ketone at a high space time yield by the use of an aqueous solution of palladium compound and ferric sulfate which always contains an excess of chlorine with respect to palladium, said chlorine being present in an amount far less than that contained in conventional catalyst solutions.

A still further object of the present invention is to provide a novel aqueous solution having a specific composition which can be utilized to produce methyl ethyl ketone at a high space time yield from n-butene. These and other objects will become apparent from the following detailed description of this invention.

BRIEF DESCRIPTION OF THE DRAWING

The figure represents a plot of the yield of methyl ethyl ketone per occupied hour versus the chlorine ion content in gram ions per liter.

DETAILED DESCRIPTION OF THE INVENTION

According to the present invention, n-butene is brought into contact with an aqueous catalyst solution containing a water-soluble chloride compound, a water-soluble palladium compound and ferric sulfate in which the content of chlorine ion is 0.005–0.15 gram ion per liter of the aqueous solution and the chemical equivalent ratio of chlorine to palladium in said solution is within the ratio of 1.5/1–20/1 (as used herein, the term "chemical equivalent ratio of chlorine to palladium" is used to designate the ratio of univalent chlorine to bivalent palladium). Also, as used herein, the term chlorine ion is intended to encompass the $Cl^-$ ion, to thereby convert n-butene into methyl ethyl ketone at a high space time yield with effective prevention of the formation of such by-products as 3-chlorobutanone-2, etc.

These facts will be clear upon reference to the drawings, the examples and the remaining detailed description of the invention.

As is apparent from FIG. 1, the space time yield of methyl ethyl ketone is greatly increased to reach maximum values when the chlorine ion content of the solution of the present invention is within the range of 0.005–0.15 gram atom per liter, preferably 0.01–0.1 gram ion per liter, in comparison to the case when no chlorine ion is contained in the aqueous catalyst solution. Moreover, the space time yield of methyl ethyl ketone obtained according to the present invention is about 20 times higher than that (30 g./lit./hr.) obtained according to the Hoechst-Wacker Process as disclosed in the foregoing "Sixth Petroleum Congress" article, where n-butene is contacted with an aqueous solution containing only palladium chloride and cupric chloride.

On the other hand, the space time yield of methyl ethyl ketone lowers rapidly at chlorine ion contents in the range up to 0.005 gram ion per liter and beyond 0.15 gram ion per liter. Moreover, the space time yield of methyl ethyl ketone maintained its peak point within the range 1.5–20 of the chemical equivalent ratio of chlorine to palladium in the aqueous catalyst solution. At a ratio less than 1.5, the space time yield of methyl ethyl ketone is abruptly lowered and is accompanied by precipitation of metallic palladium during the reaction. Further, the regeneration of the spent catalyst solution with an oxygen-containing gas, such as oxygen and air, may be difficult. When the ratio of chlorine to palladium in the aqueous catalyst solution exceeds 20, the space time yield of methyl ethyl ketone also again abruptly lowers, and many unwanted by-products such as 3-chlorobutanone-2, etc. may be formed.

It is therefore a novel discovery that the aqueous catalyst solution containing a water-soluble chloride compound, a water-soluble palladium compound and ferric sulfate in a specific composition exhibits a remarkable catalytic activity for the conversion of n-butene into methyl ethyl ketone.

The aqueous catalyst solution used in the present invention is distinguished from that used in conventional Hoechst-Wacker Processes in such that the former does not contain as large an amount of chlorine, as much as 4 gram atoms (2 moles as cupric chloride) per mole of olefin, as is used in the latter process. Further, the former does not contain the same chemical equivalent of palladium and chlorine (for instance, 2 atoms of chlorine per atom of palladium as in $PdCl_2$; Cl/Pd chem. eq. ratio=1); and, the former uses a mixed aqueous solution containing a palladium compound, ferric sulfate and a constant excess of chlorine to palladium, said chlorine being present in an amount far less than that contained in conventional catalyst solutions.

In the present invention, the n-butene starting material may be 1-butene, cis-2-butene, trans-2-butene and mixtures thereof. A mixture of $C_4$ hydrocarbon fractions comprising n-butene in addition to isobutene, n-butane and/or isobutane may also be employed as the starting material for the process of this invention as well. When the starting material contains isobutene the product will contain tertiary butanol in addition to the main product, methyl ethyl ketone. This is due to the fact that isobutene in the starting material undergoes selective hydration to form tertiary butanol by the catalytic action of ferric sulfate salt in the aqueous catalyst solution. When the starting material contains alkadienes (for example, butadiene, methyl allene, etc.) and/or alkynes (for example, dimethyl acetylene, diacetylene, ethyl acetylene, vinyl acetylene, methyl acetylene, acetylene, etc.), it is desirable to preliminarily remove these impurities by the use of a platinum group metal catalyst in the presence of hydrogen so as to avoid hindering the reaction. These starting materials can be industrially supplied from the B—B fraction of ethylene plants, the B—B fractions from butadiene extraction plants and a B—B fraction from an n-butane catalytic dehydrogenation plant.

The chloride compounds used in the present invention can be any of those which are substantially water-soluble, and inorganic chlorine compounds are preferred. For example, hydrogen chloride, hydrochloric acid, and metal chlorides such as ferric chloride, cupric chloride, cobalt chloride, nickel chloride, chromium chloride, potassium chloride, sodium chloride, calcium chloride, barium chloride, strontium chloride and the like are employed. Moreover, organic chlorine compounds, such as monochloroacetic acid, dichloroacetic acid, and acetyl chloride, may be employed as well.

The palladium compounds used in the present invention can be any of those which are water-soluble, and suitably include palladium sulfate, palladium nitrate, palladium chloride, palladium potassium chloride, palladium acetate and the like. Among these, inorganic palladium salts which are easily soluble in either water or an aqueous solution of mineral acids, for example, palladium sulfate, palladium nitrate, palladium chloride, palladium potassium chloride, etc., are preferred.

Ferric sulfate may be employed in the form of either the anhydrous salt or the hydrated salt thereof.

The aqueous catalyst solution of the present invention may be prepared by weighing the above-mentioned chloride compound and the palladium compound at such proportions that the resultant aqueous solution contains 0.005–0.15 gram ion of chlorine ion per liter of the solution, and the chemical equivalent ratio of chlorine to palladium is in the range of 1.5/1 to 20/1. Thereafter chloride compound and palladium compound are dissolved together with the requisite amount of ferric sulfate in the necessary amount of water. If the palladium compound utilized has no chlorine, such as palladium sulfate or palladium nitrate, the total requisite amount of chlorine ion must be supplied by the chloride compound. On the other hand, only supplemental amounts of the required chlorine ion (total) need be supplied by the chloride compound in the case of employing chloride-containing palladium compounds such as palladium chloride. Ferric sulfate is usually employed in an amount of from 50–500 g. (on the basis of the anhydrous salt) per liter of the aqueous catalyst solution. Greater or lesser amounts of ferric sulfate may, however, be employed within the scope of the invention, the above range being the preferred range.

During the preparation of the catalyst solution or during the reaction, precipitation of ferric hydroxide due to hydrolysis of the ferric sulfate will sometimes occur. In order to avoid the formation of ferric hydroxide, it is only necessary to render the catalyst solution acidic, either during preparation or during reaction, for example by adding a mineral acid, such as sulfuric acid in an amount of 0.5–100 g./lit. to the catalyst solution. Of course, equivalent acids to yield equivalent molarities may be used.

The aqueous catalyst solution of the present invention usually is employed in the proportion of 0.1–100 lit., preferably 0.2–100 lit. per mole of n-butene. If the amount is less than 0.1 liter, the product yield may be lower. Amounts greater than 100 liters will not result in any practical advantage and will be uneconomical.

The reaction for the production of methyl ethyl ketone from n-butene according to the present invention may occur between a gaseous phase (starting material) and a liquid phase (aqueous catalyst solution) at ordinary temperatures under atmospheric pressure. Preferably, the reaction is carried out at an elevated temperature under pressure in order to increase the reaction rate. Thus, the reaction may be practically performed at a temperature between room temperature and 200° C., preferably 70–120° C., under a pressure sufficient to at least maintain the aqueous catalyst solution in the liquid phase, usually at a pressure from atmospheric pressure to 50 atmospheres, preferably from 5 to 40 atmospheres, whereby reaction will occur chiefly between a liquid phase (starting material) and a liquid (aqueous catalyst solution) phase. At a temperature greater than 200° C., hydrolysis may occur to precipitate ferric hydroxide, and the space time yield of methyl ethyl ketone may be lowered thereby. Since the reaction, according to the present invention, involves a reaction between phases that are restricted, it is advantageous to employ any means that insures intimate contact between the phases or which enhances their miscibility. Intimate contact can be achieved by mechanical operations such as stirring, shaking, sprinkling or utilizing oscillations and also by chemical operations that promote the formation of large surfaces. To enhance miscibility, an inert solvent promoter such as, for example, methanol, ethanol, ethylene glycol, polyethylene glycol, dioxane, dimethyl formamide, acetic acid, propionic acid and the like, can be added. The contact between the n-butene and the aqueous catalyst solution in accordance with the present invention can be carried out by any contact method, for example counter-current or concurrent exchange and by blowing n-butene into a stream of the aqueous catalyst solution.

Moreover, the reaction may be carried out in batch, semi-continuous or continuous operations.

For the recovery of the product methyl ethyl ketone, the reaction mixture can be subjected to distillation, stream-stripping or other standard techniques to give a mixture of methyl ethyl ketone and water. Unreacted n-butene may be recovered and recycled into the reaction zone. Spent catalyst solution may be recycled into the reaction zone after being adjusted to the necessary concentration by adding make-up water and by being regenerated by conventional catalyst regeneration methods such as oxidation using oxygen or oxygen-containing gases such as air.

Various conventional methods can be used to separate anhydrous methyl ethyl ketone from the mixture. For example, the mixture may be treated with well-known dehydrating agents such as anhydrous salt cake, rock salt etc., to eliminate the water. Also, the mixture can be admixed with an appropriate amount of a conventional substance which can modify the relative volatility of methyl ethyl ketone and water (for example, cyclohexane, n-hexane, methyl cyclopentane, etc.) and the mixture then distilled to remove the water.

Since the aqueous catalyst solution of the invention is somewhat corrosive, portions of apparatus contacting the catalyst solution should be formed of anti-corrosive materials such as titanium, tantalum, synthetic resins, rubber, enamel, glass, porcelain, ceramics, etc.

As described in detail heretofore, the present invention allows the large scale production of methyl ethyl ketone at a low cost due to the following advantages:

(a) The space-time yield of methyl ethyl ketone is very high. Accordingly, the volume of the reactor can be reduced to a very compact size. Moreover, the reaction period can be shortened and the amount of expensive catalyst solution can be kept to a minimum.

(b) The amount of by-products is very small. According to the invention, the amount of by-products such as 3-chlorobutanone-2, etc. is about one-tenth that formed in the conventional Hoechst-Wacker Process. No complicated operations for the purification of the product are necessary.

(c) The spent aqueous catalyst solution can be easily regenerated by the economical air oxidation method, and no expensive regeneration treatment, such as electrolytic oxidation, is necessary. Methyl ethyl ketone thus obtained has many uses in a variety of fields such as in solvents for coating materials, solvents for dewaxing of petroleum fractions and for use in materials as medicines and chemical products.

The following examples are illustrative, but not limiting, of the claimed invention.

EXAMPLE 1

Into a 50 ml. glass reactor equipped with a magnetic stirrer, there were charged 40 ml. of an aqueous catalyst solution containing 1 g. $PdSO_4 \cdot 2H_2O$ and 280 g.

$$Fe_2(SO_4)_3 \cdot 9H_2O$$

per liter of the aqueous solution, and the requisite amount of hydrochloric acid as the chloride compound. 5 ml. of liquid 1-butene was charged to the reactor, and then nitrogen gas was introduced to a pressure of 6 atm. g. The resultant mixture was heated at 105° C. under 15 atm. g. for 2 minutes while stirring at a rate of 2,000 r.p.m. Thereafter, the reacted mixture in the reactor was transferred to a conventional distillation column and distilled to distill out unreacted n-butene and then a mixture of methyl ethyl ketone and water at the top of the column. The spent aqueous catalyst solution was obtained as the bottom fraction. The mixture of methyl ethyl ketone and water obtained was contacted with salt cake for dehydration to give crude methyl ethyl ketone. The purity of the crude methyl ethyl ketone was calculated by gas chromatographic analysis. A small amount of 3-chlorobutanone-2 was detected as a by-product.

Experiments similar to the above were carried out with eight differing in chlorine ion content and chemical equivalent ratio of chlorine to palladium prepared by changing the amount of hydrochloric acid added. The results of these experiments are given in Table 1.

TABLE 1

| Run No. | Composition of catalyst solution | | Space-time yield of MEK[1] (g./l./hr.) | Weight ratio of byproducts to MEK[1] |
|---|---|---|---|---|
| | Chlorine ion content (gram-ion/l.) | Cl/Pd chemical equivalent ratio | | |
| 1 | 0 | 0 | 123 | 0 |
| 2 | 0.02 | 2.38 | 355 | 0 |
| 3 | 0.04 | 4.77 | 494 | 0.0015 |
| 4 | 0.05 | 5.96 | 541 | 0.0025 |
| 5 | 0.06 | 7.16 | 527 | 0.0035 |
| 6 | 0.08 | 9.54 | 352 | 0.006 |
| 7 | 0.125 | 14.9 | 212 | 0.018 |
| 8 | 0.25 | 29.8 | 88 | 0.038 |

[1] Methyl ethyl ketone.

It is clear from Table 1 that the space time yield of methyl ethyl ketone takes a definite peak, and the formation of by-products is very small, when the aqueous solution containing a palladium compound and ferric sulfate used for reacting n-butene contains 0.005–0.15 gram ion chlorine ion per liter and the chlorine to palladium ratio is within the range of 1.5–20 (chemical equivalent ratio). The relationship between the chlorine ion content and the space time yield of methyl ethyl ketone shown in Table 1 was plotted as curve (A) in the drawings, in which the abscissa represents the chlorine ion content (gram ion per liter) in one liter of the solution, and the ordinate indicates the space time yield (g./lit./hr.) of methyl ethyl ketone.

EXAMPLE 2

The same procedure as Example 1 was used except that ferric chloride replaced the hydrochloric acid. The results are given in Table 2.

TABLE 2

| Run No. | Composition of catalyst solution | | Space-time yield of MEK (g./l./hr.) | Weight ratio of byproducts to MEK |
|---|---|---|---|---|
| | Chlorine ion content (gram ion/l.) | Cl/Pd chemical equivalent ratio | | |
| 9 | 0.014 | 1.67 | 238 | 0 |
| 10 | 0.055 | 6.56 | 669 | 0.0016 |
| 11 | 0.14 | 16.7 | 200 | 0.013 |
| 12 | 0.28 | 33.4 | 98 | 0.034 |

As is apparent from Table 2, the space time yield of methyl ethyl ketone takes a definite peak with minimum formation of by-products when the aqueous catalyst solution reacted with n-butene has the specific composition of the present invention containing a chloride, such as ferric chloride, a palladium compound and ferric sulfate. The relation between the space time yield and the chlorine ion content shown in Table 2 is plotted in the drawing as curve (B).

EXAMPLE 3

The experiment was carried out in the same manner as Example 1 except that cupric chloride was used as the chloride compound instead of hydrochloric acid. The results are given in Table 3.

TABLE 3

| Run number | Composition of catalyst solution | | Space time yield of MEK (g./l./hr.) |
|---|---|---|---|
| | Chlorine ion content (gram ion/liter) | Cl/Pd chemical equivalent ratio | |
| 13 | 0.029 | 6.30 | 306 |
| 14 | 0.057 | 12.39 | 604 |
| 15 | 0.147 | 19.53 | 197 |

EXAMPLE 4

The feed n-butene used had the composition shown in Table 4.

TABLE 4

| Compounds: | Content (mole percent) |
|---|---|
| n-Butene (a mixture of 1-butene and 2-butene) | 60.6 |
| Isobutene | 23.2 |
| n- and isobutane | 16.2 |

Into a 6 liter titanium cylindrical reactor (2 meters high) equipped with a stirrer and baffle plates, there were continuously introduced n-butene having the composition shown in Table 4 at a feed-rate of 5.2 kg./hr. and an aqueous catalyst solution (containing 1 g. $PdCl_2$, 280 g. $Fe_2(SO_4)_3 \cdot 9H_2O$ and 7 g. $FeCl_3 \cdot 6H_2O$ per liter of the solution; chlorine ion content was 0.092 gram ion per liter; chlorine to palladium chemical equivalent ratio was 8.17) at a feed rate of 100 lit./hr., both being introduced into the bottom of the reactor. The reaction was carried out at 110° C. under 30 atm. g. with concurrent contact while stirring at a rate of 700 r.p.m. The product formed was separated from the reaction mixture by conventional means. Methyl ethyl ketone was obtained at the rate of 3501 g./hr., which corresponded to a space time yield of 583.5 g./lit./hr. In addition, tertiary butanol was obtained at the rate of 1214 g./hr. By-products such as 3-chlorobutanone-2, etc. were detected, but the yield was small as 18.5 g./hr.

EXAMPLE 5

The same experimental procedure described in Example 4 was utilized except that 100 lit./hr. of the catalyst solution used contained 0.77 g. $Pd(NO_3)_2$, 280 g. $Fe_2(SO_4)_3 \cdot 9H_2O$ and 5 g. $FeCl_3 \cdot 6H_2O$ (chlorine ion content: 0.057 gram ion per liter; chlorine to palladium chemical equivalent ratio; 8.63). There were obtained 3405 g./hr. of methyl ethyl ketone and 1182 g./hr. of tertiary butanol. The space time yield of methyl ethyl ketone was 569.5 g./lit./hr. The formation of by-products such as 3-chlorobutanone-2, etc. was as small as in Example 4.

COMPARATIVE EXAMPLE 1

The experimental procedure utilized was the same as in Example 1 except that 40 ml. of an aqueous catalyst solution containing 0.75 g. $PdCl_2 \cdot 70$ g. $Fe_2(SO_4)_3 \cdot 9H_2O$ and 200 g. $FeCl_3 \cdot 6H_2O$ per liter of the aqueous solution (chlorine ion content: 2.31 gram ions per liter; chlorine to palladium chemical equivalent ratio: 275) was utilized. The space time yield of methyl ethyl ketone was only 57 (g./lit./hr.); and the weight ratio of by-products to methyl ethyl ketone was 0.26.

As seen from this example, the space time yield of methyl ethyl ketone remarkably decreases when the chlorine ion content in the aqueous catalyst solution exceeds 0.2 gram ion per liter and the chemical equivalent ratio of chlorine to palladium exceeds 20. Moreover, the formation of by-products amounts to as high as 26 parts by weight per 100 parts of the product methyl ethyl ketone.

COMPARATIVE EXAMPLE 2

The same procedure as Example 1 was utilized except that 40 ml. of the aqueous catalyst solution used contained 0.75 g. $PdCl_2$ and 271 g. $FeCl_3 \cdot 6H_2O$ per liter of the aqueous solution (chlorine ion content: 3.13 gram ions per liter; chlorine to palladium chemical equivalent ratio: 372). The space time yield of methyl ethyl ketone obtained was 40 (g./lit./hr.) and the weight of by-products to methyl ethyl ketone was 0.42.

The above results prove that the space time yield of methyl ethyl ketone shows a great reduction and the by-product formation is greatly increased in the case of Comparative Example 1 when the chlorine ion content in the solution exceeds 0.2 gram ion per liter and the chlorine to palladium equivalent ratio exceeds 20, and also in case that the catalyst solution contains no ferric sulfate.

What is claimed is:

1. A three component aqueous catalyst solution for the production of methyl ethyl ketone from n-butene which consists essentially of
   (1) a water-soluble palladium compound,
   (2) ferric sulfate, and
   (3) a water-soluble chloride compound selected from the group consisting of hydrogen chloride, transition metal chlorides, alkali metal chlorides and alkaline earth metal chlorides,
in which the chlorine ion content per liter of said solution is in the range of from about 0.005 to about 0.1 gram ion and the chemical equivalent ratio of chlorine to palladium in said solution is in the range of from about 1.5/1 to about 20/1 and in which the amount of ferric sulfate per liter of said solution is in the range of from about 50 to about 500 grams.

2. The aqueous catalyst solution of claim 1 in which the chloride compound is hydrogen chloride.

3. The aqueous catalyst solution of claim 1 in which the chloride compound is a transition metal chloride.

4. The aqueous catalyst solution of claim 1 in which the palladium compound is an inorganic acid salt of palladium.

5. The aqueous catalyst solution of claim 1 in which the chlorine ion content per liter of said solution is in the range of from about 0.01 to about 0.1 gram-ion.

6. A process for the production of methyl ethyl ketone which comprises contacting n-butene with a three component aqueous catalyst solution at a temperature between room temperature and about 200° C. and a pressure sufficient to maintain at least the catalyst solution in the liquid phase, said catalyst solution consisting essentially of
(1) a water-soluble palladium compound,
(2) ferric sulfate, and
(3) a water-soluble chloride compound selected from the group consisting of hydrogen chloride, transition metal chlorides, alkali metal chlorides, and alkaline earth metal chlorides,
in which the chlorine ion content per liter of said solution is in the range of from about 0.005 to about 0.15 gram-ion and the chemical equivalent ratio of chlorine to palladium in said solution is in the range of from 1.5/1–20/1 and in which the amount of ferric sulfate per liter of said solution is in the range of from about 50 to about 500 grams.

7. The process of claim 6 in which the chloride compound is hydrogen chloride.

8. The process of claim 6 in which the chloride compound is a transition metal chloride.

9. The process of claim 6 in which the palladium compound is an inorganic acid salt of palladium.

10. The process of claim 6 in which the n-butene is supplied as a mixture of $C_4$ hydrocarbon fraction containing n-butene.

11. The process of claim 6 wherein said aqueous catalyst solution is utilized in an amount of from about 0.1 to about 100 liters per mole of n-butene.

12. The process of claim 6 wherein said contacting is performed at a temperature within the range of from about 70 to about 120° C. and at a pressure of from about 5 to about 40 atmospheres.

References Cited

UNITED STATES PATENTS

| 3,080,425 | 3/1963 | Smidt | 260—586 |
| 3,153,083 | 10/1964 | Smidt | 260—465.1 |

FOREIGN PATENTS

| 878,777 | 10/1961 | England | 260—597 |

DANIEL E. WYMAN, Primary Examiner

W. J. SHINE, Assistant Examiner

U.S. Cl. X.R.

252—440, 441